United States Patent

[11] 3,624,784

[72] Inventors Thomas M. Larson
 Milwaukee, Wis.;
 Melvin E. Putnam, Escanaba, Mich.
[21] Appl. No. 51,126
[22] Filed June 30, 1970
[45] Patented Nov. 30, 1971
[73] Assignee Harnischfeger Corporation
 West Milwaukee, Wis.

[54] DECKING AND UNDECKING APPARATUS FOR A TRUCK CRANE
 18 Claims, 16 Drawing Figs.

[52] U.S. Cl. .................................................. 214/38 CC,
 214/152, 214/515, 280/415 B
[51] Int. Cl. .................................................. B65g 67/02
[50] Field of Search .................................... 214/38 R,
 38 CC, 152, 515; 280/415 B, 423 R

[56] References Cited
UNITED STATES PATENTS
3,285,449 11/1966 Hand ............................ 280/415 B X
3,302,806 2/1967 Brown et al. .................. 214/38 R Primary Examiner—Robert G. Sheridan
Attorney—James E. Nilles ABSTRACT: A self-powered decking and undecking assembly for assembling or removing the superstructure for a truck crane from the carrier, said assembly including a tractor having a front strut and a trailer having a rear strut, the front and rear struts being adapted to be connected to the superstructure. The front strut includes a fifth wheel kingpin adapter for connection to the tractor and a first pair of vertical hydraulic piston and cylinder assemblies for raising the front strut relative to the tractor. The rear strut is connected to a rotatable strut mount provided on the trailer which includes a second pair of vertical hydraulic piston and cylinder assemblies for raising the rear strut relative to the trailer. The vertical hydraulic piston and cylinder assemblies are pivotally mounted on their respective supports and are pivoted by a third pair of hydraulic piston and cylinder assemblies for adjusting the lateral position of the superstructure with respect to the carrier. The trailer includes rear steering wheels which can be placed in a caster mode of operation.

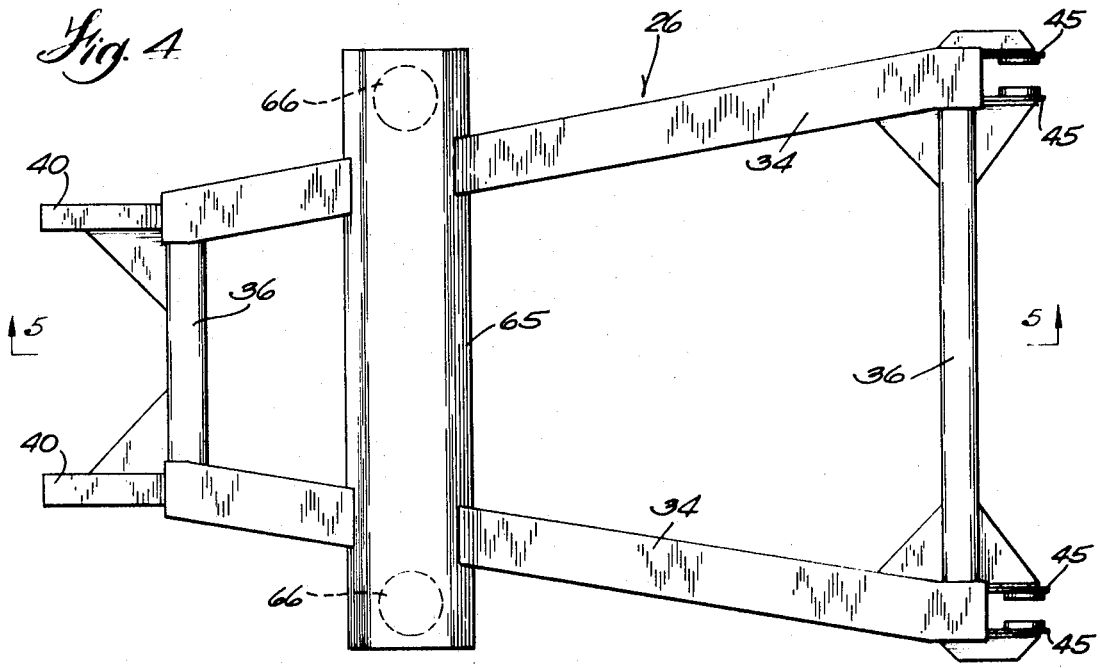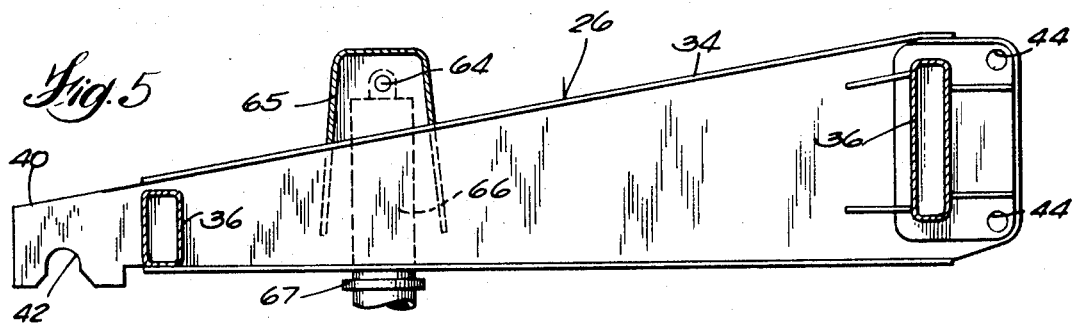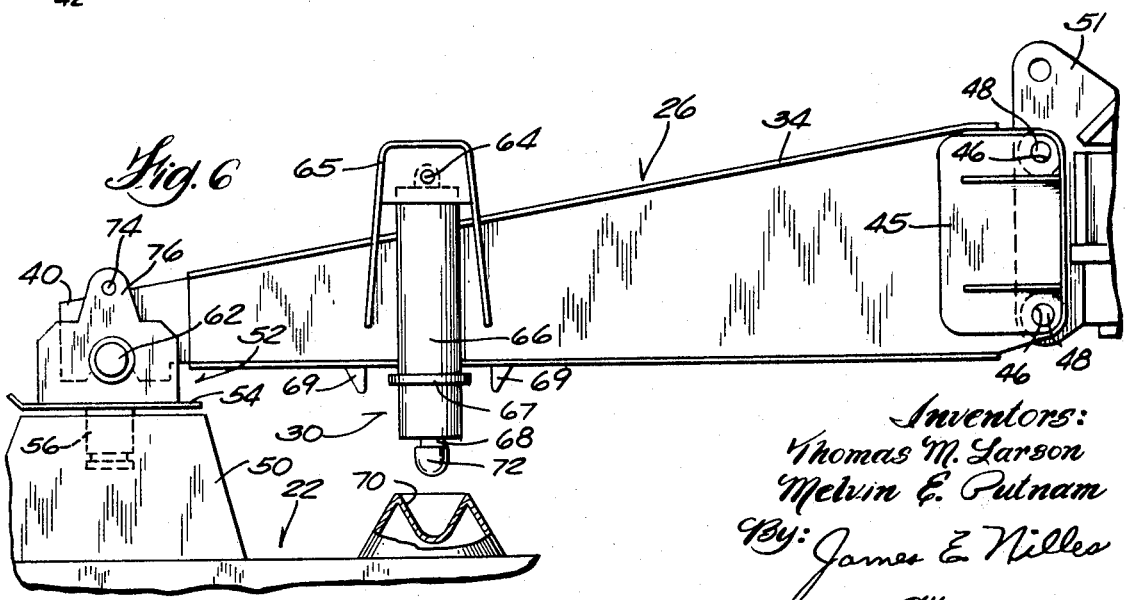

Inventors:
Thomas M. Larson
Melvin E. Putnam
By James E. Nilles
Attorney

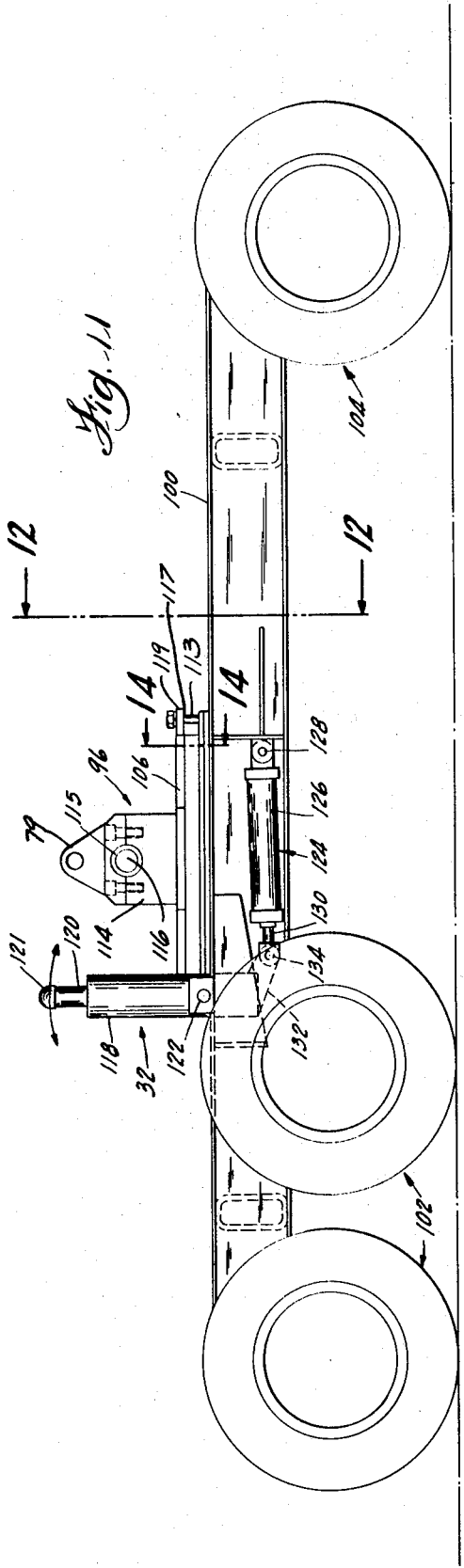
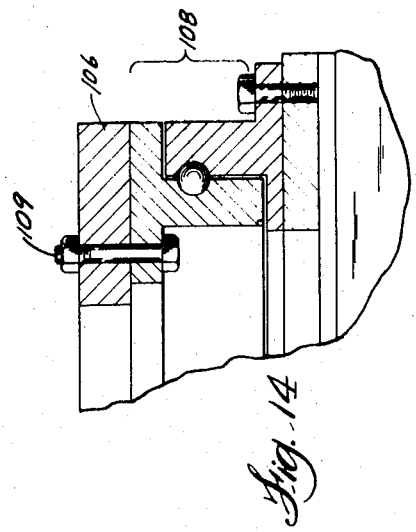
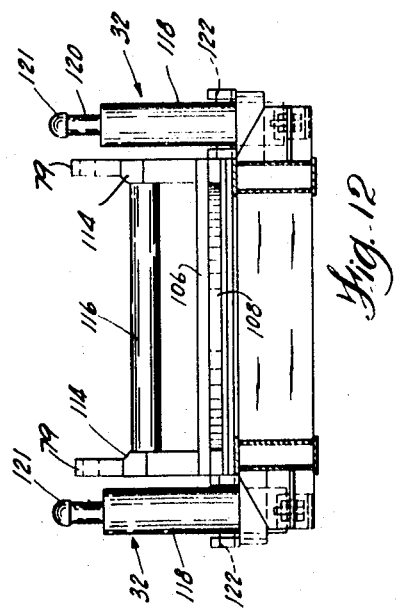
Inventors:
Thomas M. Larson
Melvin E. Putnam
By: James E. Nilles
Attorney

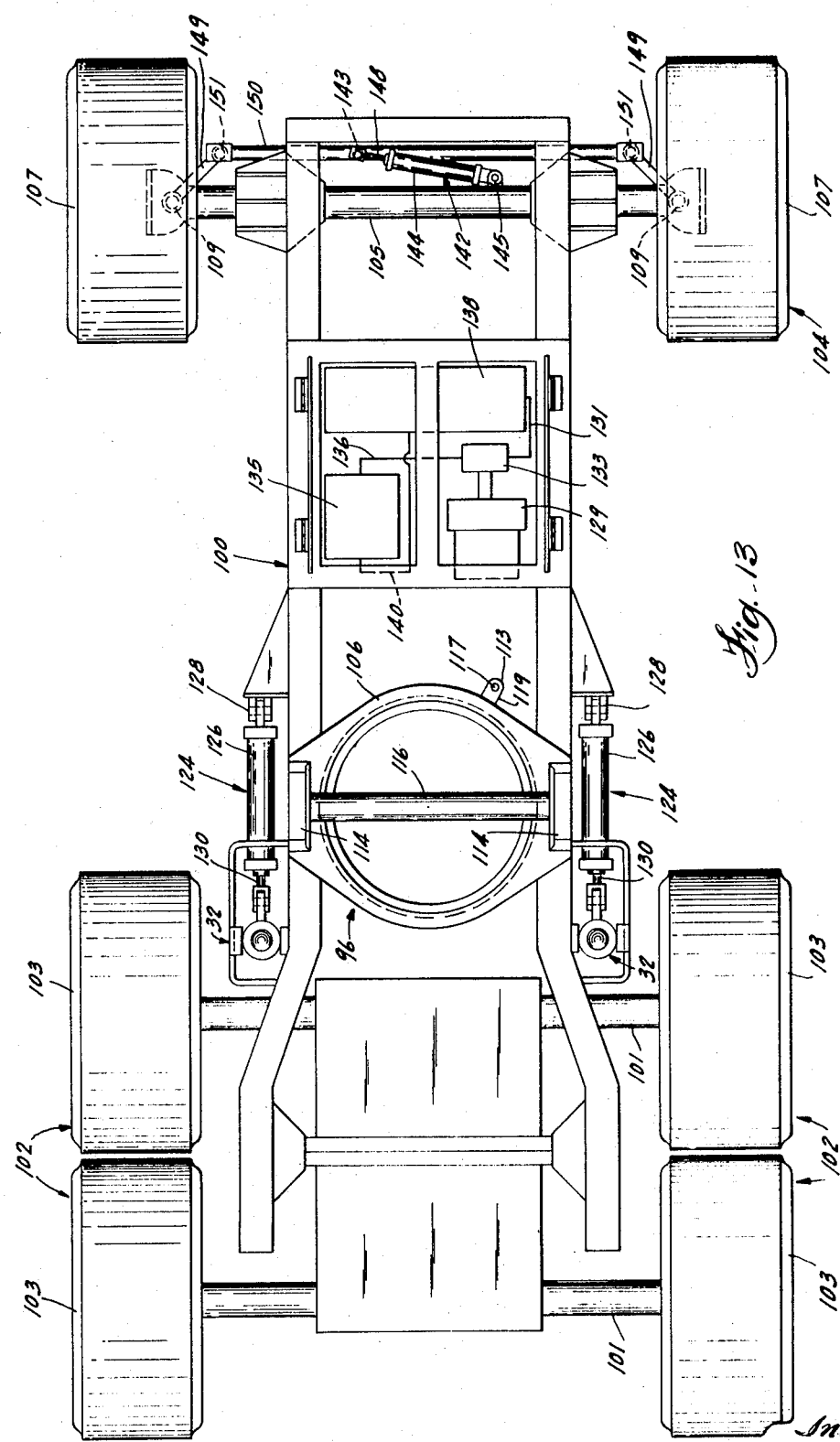

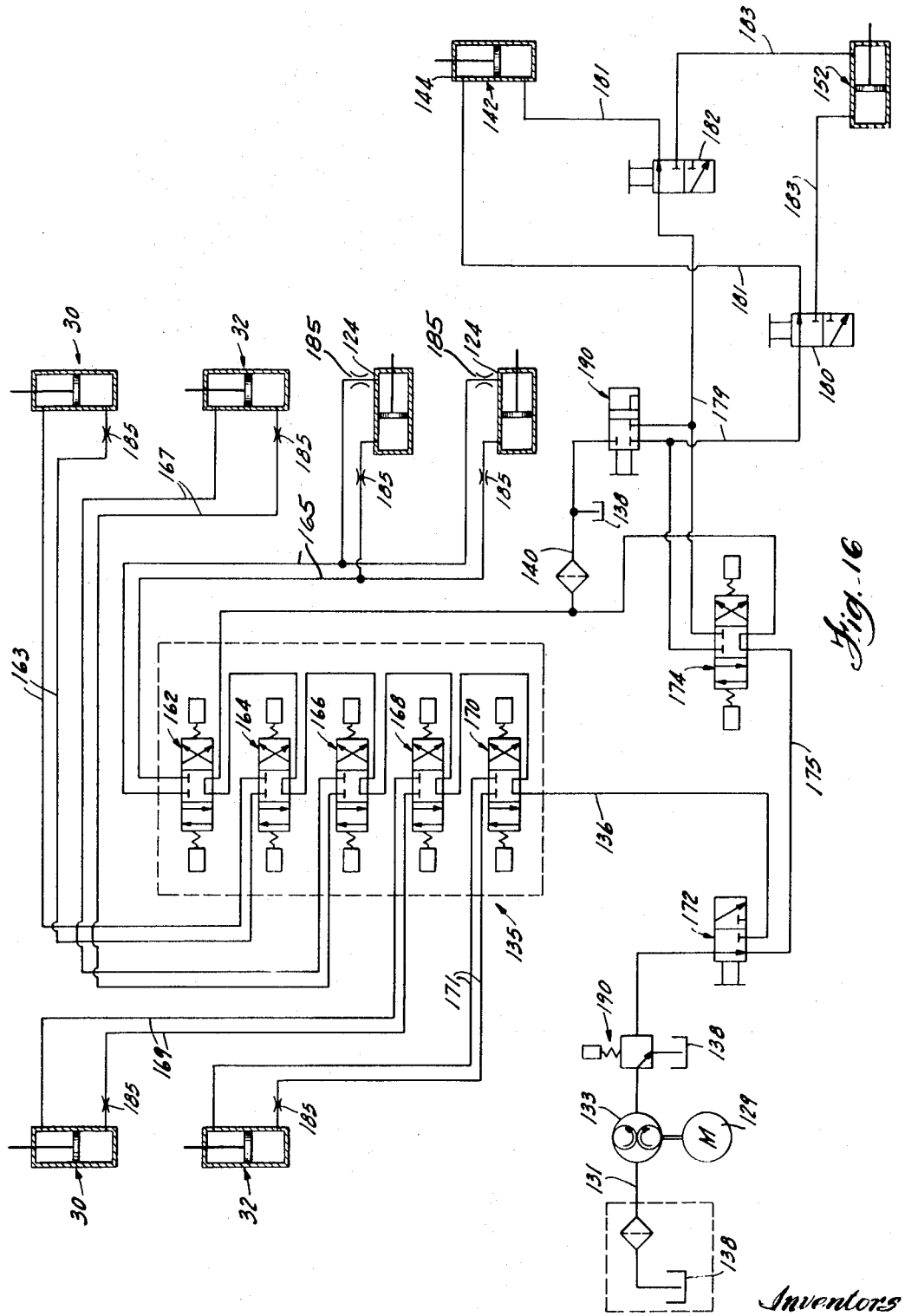

3,624,784

DECKING AND UNDECKING APPARATUS FOR A TRUCK CRANE

BACKGROUND OF THE INVENTION

Truck cranes presently being used have been made so heavy that they cannot be transported as a complete unit on some highways due to weight limitations. Often it is necessary to remove several of the components of the truck crane such as the counterweights and boom in order to lighten the load for transportation to a new job site. In extreme cases, the superstructure has to be removed from the carrier in order to reduce the weight to an extent where it can be transported over the highway by a separate tractor and trailer arrangement. This usually involves the use of a second crane to remove either the component parts or the entire superstructure from the carrier.

SUMMARY OF THE INVENTION

The self-powered decking and undecking assembly of the present invention can be used for decking and undecking the superstructure from the carrier of a truck crane as well as for transporting the superstructure of the truck crane separately from the truck crane carrier. The front and rear struts of this assembly are so designed that they can be easily attached to the superstructure without the use of a separate crane. The struts are adapted to be pivotally and rotatably connected to a tractor and trailer for transporting the superstructure separately from the carrier. Hydraulic piston and cylinder assemblies are used to raise the superstructure relative to the carrier so that the carrier can be driven out from under the superstructure and then lowered into locking engagement with the tractor and trailer. The trailer is self trailering or centering and contains or carries an independent hydraulic power system for actuating all of the hydraulic assemblies necessary to deck and undeck the superstructure from the carrier. The hydraulic piston and cylinder assemblies are so arranged that the superstructure can be moved laterally with respect to the carrier to aid in aligning the superstructure with the carrier during the decking operation.

Other objects and advantages will be apparent from the following detailed description when read in connection with the accompanying drawings.

THE DRAWINGS

FIG. 4 is a top view of the front strut;

FIG. 5 is a view taken on line 5—5 of FIG. 4 showing one of the first pair of hydraulic piston and cylinder assemblies;

FIG. 6 is a side view of the front strut shown connected to the fifth wheel of a tractor and to the crane superstructure;

FIG. 11 is a side view of the trailer;

FIG. 12 is a view taken on line 12—12 of FIG. 11 showing the second pair of hydraulic piston and cylinder assemblies for the trailer;

FIG. 13 is a top view of the trailer with the doors open to show the hydraulic system;

FIG. 14 is a section view taken on line 14—14 of FIG. 11 showing the pivot arrangement for the rear strut mount;

FIG. 16 is a hydraulic circuit diagram of the hydraulic system.

DESCRIPTION OF THE INVENTION

A truck crane 10 of the type contemplated herein generally includes a carrier 12 and a crane superstructure 14. The superstructure 14 is mounted for rotary motion on a slew ring 16 provided on the carrier 12. Outriggers 18 are mounted on the carrier 12 to provide stability when using the truck crane 10. When the combined weight of the superstructure 14 and carrier 12 exceeds the weight limit of the highway it becomes necessary to remove the entire superstructure 14 from the carrier 12 and to transport the superstructure 14 independently of the carrier to the new job site.

In accordance with the invention, means are provided for decking and undecking the superstructure 14 from the carrier 12 and for independently transporting the superstructure to a new job site. Such means is in the form of a self-powered decking and undecking assembly which is used to raise the superstructure 14 high enough relative to the carrier 12 to clear the swing pinion and slew ring 16. The carrier 12 can then be driven out from under the superstructure 14 or backed under the superstructure 14 for decking the superstructure 14 on the carrier 12.

Figure 1:
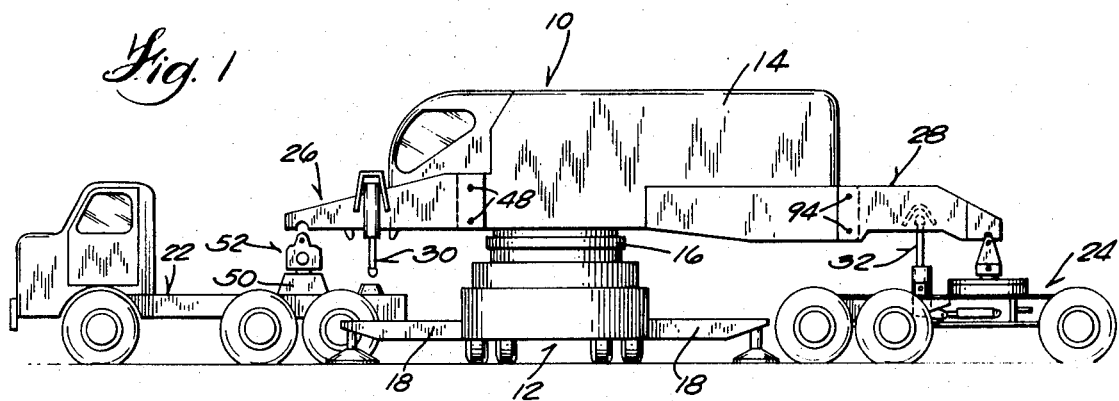
FIG. 1 is a side view of the invention shown ready for removal of the superstructure from the carrier.
Figure 2:
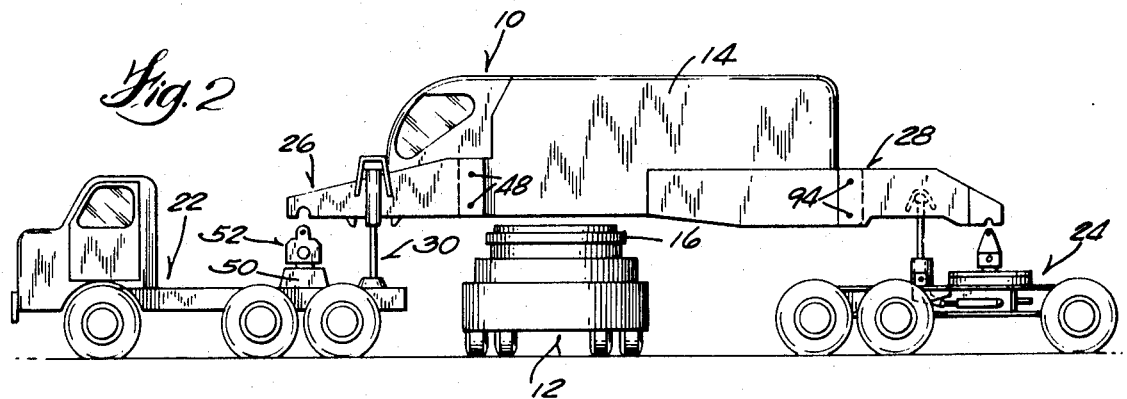
FIG. 2 is a view similar to FIG. 1 showing the superstructure elevated for removal of the carrier.
Figure 3:
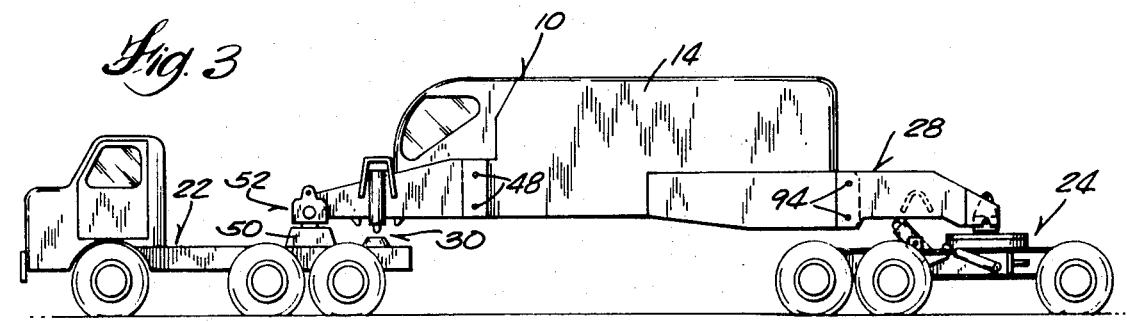
FIG. 3 is a view similar to FIG. 1 showing the superstructure lowered for transportation by the tractor and trailer.

In this regard, and referring to FIG. 1, the decking and undecking assembly generally includes a tractor 22 having a front strut 26 and a trailer 24 having a rear strut 28. As seen in FIG. 1, the superstructure 14 is rotated to a position transverse to the carrier 12 and is connected to the tractor 22 by the front strut 26 and to the trailer 24 by the rear strut 28. The bolts (not shown) securing the superstructure 14 to the slew ring 16 are removed for disassembly. The superstructure 14 is elevated with respect to the carrier 12, as seen in FIG. 2, by means of hydraulic piston and cylinder assemblies 30 and 32 operatively connected to the front and rear struts, respectively. The outriggers 18 are retracted and the carrier 12 is driven out from under the superstructure 14. The superstructure 14 is lowered to lock the front strut 26 to the tractor 22 and the rear strut 28 to the trailer 24 as seen in FIG. 3. The hydraulic assemblies are retracted far enough so as not to obstruct the movement of the front and rear struts in travel. The superstructure 14 is now supported for transport independent of the carrier 12. When the superstructure 14 is ready for reassembly onto the carrier 12, the above steps are reversed, as more particularly described hereinafter.

THE FRONT STRUT

More particularly and referring to FIGS. 4, 5 and 6 of the drawings, the front strut 26 includes a pair of side members 34 in the form of box beams connected by cross members 36. The front strut 26 is secured to a fifth wheel 50 pivotally mounted on the tractor 22 by means of a fifth wheel kingpin adapter 52 and a hook or gooseneck 40 secured to the end of each of the side members 34. The gooseneck includes a semicircular opening 42. The front strut 26 is secured to the superstructure 14 by means of pins 48 positioned in holes 44 provided in plates 45 secured to each side of each of the side members 34. The holes 44 are aligned with corresponding holes 46 provided in a plate 51 on the superstructure 14. The pins 48 are inserted into the holes 44 and 46 when the front strut 26 is properly aligned with the superstructure 14.

Figure 7:
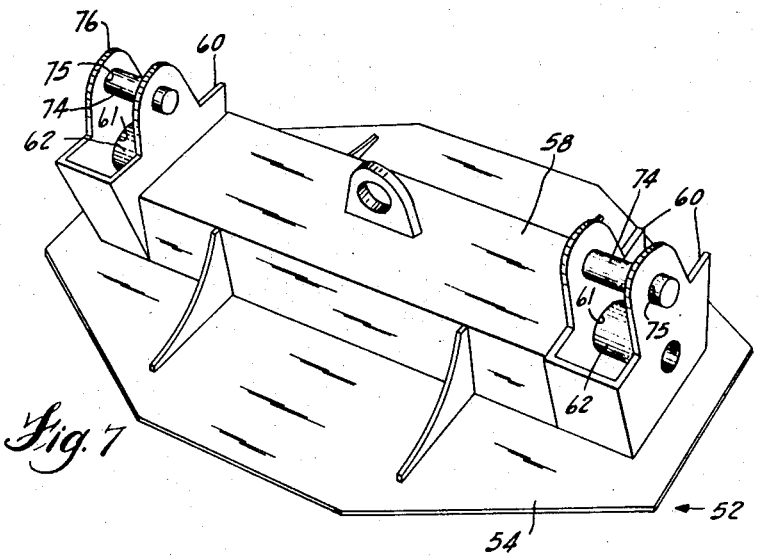
FIG. 7 is a perspective view of the fifth wheel kingpin adapter.

The fifth wheel kingpin adapter 52 (FIGS. 6 and 7) includes a plate 54 and a kingpin 56 which is adapted to be connected to the fifth wheel 50. Since the fifth wheel is normally free to pivot on the tractor 22, the kingpin adapter 52 will pivot with the fifth wheel. A box beam 58 is secured to the top of the plate 54 and a pair of parallel plates 60 having apertures 61 are connected to the plate 54 at each end of the beam 58. A support bar or rod 62 is positioned in the apertures 61 in the plates 60 and extends through the beam 58 and is positioned to fit in the openings 42 in the goosenecks 40. A lock ear 76 having an opening 75 is provided on each of the plates 60 to lock the strut 26 to the fifth wheel kingpin 52 by inserting a pin 74 through the opening 75 over the top of the gooseneck 40.

Means are provided on the front strut 26 for elevating the strut relative to the fifth wheel 50 of the tractor. Such means is in the form of a pair of hydraulic piston and cylinder assemblies 30 each of which includes a cylinder 66 pivotally connected by pins 64 to a pivot member 65 on the front strut 26 and a piston 68. The piston 68 is positioned to engage a cup-shaped seat 70 provided on the tractor 22. A round tip 72 is provided at the end of each of the pistons 68 to allow for pivotal movement of the piston within the seat 70. The cylinders 66 are cross connected by means of a cross bar 67 for simultaneous movement. The pivotal movement of the cylinders 66 is limited by means of stops 69 provided on the side members 34 on each side of the crossbar 67.

THE REAR STRUT

Figure 8:
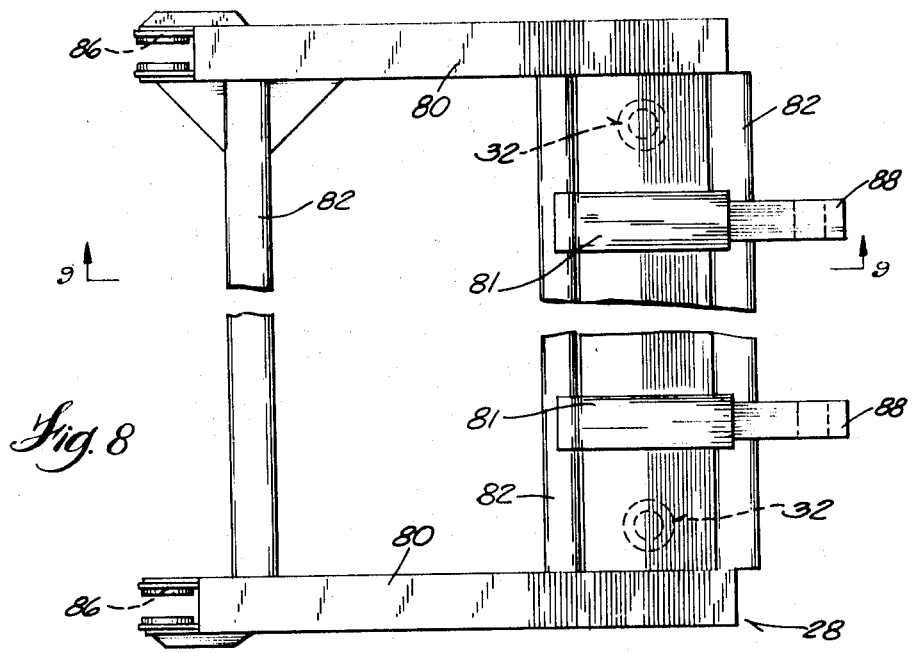
FIG. 8 is a top view of the rear strut.
Figure 9:
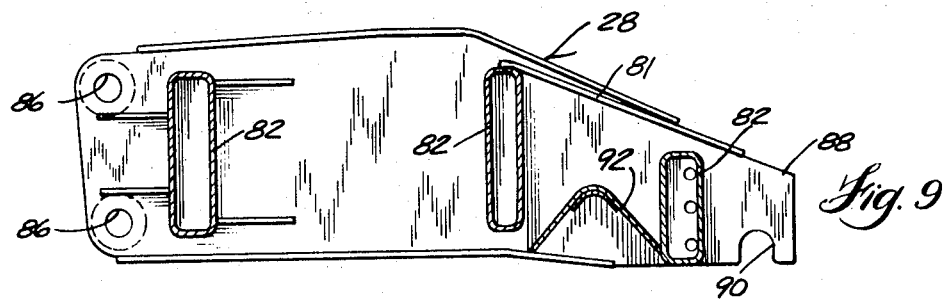
FIG. 9 is a view taken on line 9—9 of FIG. 8 showing the seat for one of the pistons of the first pair of hydraulic piston and cylinder assemblies.
Figure 10:
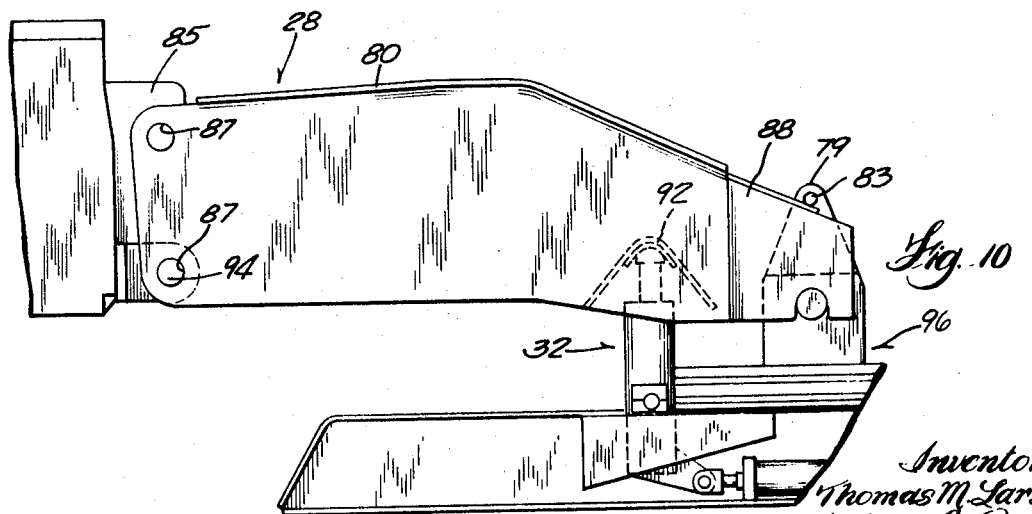
FIG. 10 is a view of the rear strut connected to the trailer strut mount and to the crane superstructure.

The rear strut, as seen in FIGS. 8, 9 and 10, includes a pair of side members 80 in the form of box beams cross connected by crossmembers 82. A pair of inner members 81 are mounted in a parallel spaced relation to the side members 34 on the crossmembers 82. The rear strut 28 is connected to the superstructure 14 by means of pins 94 which are inserted through apertures 86 provided in each side of the side members 80 and apertures 87 provided in plates 85 secured to the superstructure. The rear strut 28 is secured to a strut mount 96 on the trailer 24 by means of a gooseneck 88 provided at the other end of each of the inner members 81 which includes a semicircular opening 90 for connecting the strut 28 to the strut mount 96 on the trailer 24. A pair of inverted V-shaped piston seats 92 are secured to the rear strut 28 between the side members 80 and inner members 81 for raising the strut 28 as described below. Plates 79 are secured to strut mount 96 to lock the strut 28 to the strut mount 96 as described hereinafter.

THE TRAILER

The trailer 24, as seen in FIGS. 11 through 14, is a self-trailing type of trailer which can be used for transporting the superstructure 14 over the highway and includes a frame 100 supported by a pair of front wheel assemblies 102 and a rear wheel steering assembly 104. Each front wheel assembly 102 includes an axle 101 and a tire 103 at each end. The rear wheel steering assembly 104 includes an axle 105 and a wheel 107 pivotally connected to each end of the axle by pins 109. The rear or trailing wheels 107 are turned by means of a hydraulic piston and cylinder assembly 142 having a cylinder 144 pivotally connected to the rear axle 105 by a pin 145 and a piston 148 pivotally connected by a pin 143 to a steering rod 150 which is connected to pivot arms 149 on the wheels 107 by pins 151.

The strut mount 96 is pivotally mounted on the frame 100 and includes a plate 106 (FIGS. 11, 12 and 13) secured to a "Roteck" bearing 108 by bolts 109. A pair of vertical plates 114 are secured to the plate 106 to support a support rod 116 which is journaled in bearings 115 in the plates 114 and is adapted to be connected to the goosenecks 88. The "Roteck" bearing 108 is secured to the frame 100. The strut mount 96 is locked to the frame 100, to prevent rotation, for travel by means of a release pin 113 inserted into a hole 117 provided in a flange 119 on the plate 106 and a hole in the frame 100.

The rear strut 28 is elevated or raised with respect to the trailer by means of a second pair of hydraulic piston and cylinder assemblies 32 provided on the frame 100. These assemblies 32 each include a cylinder 118 and a piston 120. The cylinders 118 are pivotally mounted on pins 122 provided on each side of the frame 100 with the pistons 120 having rounded tips 121 positioned to engage the seats 92 in the rear strut 28.

Means are provided for pivoting the assemblies 32 on the pins 122 in the form of a third pair of hydraulic piston and cylinder assemblies 124. Each of these assemblies include a cylinder 126 pivotally secured to the frame 100 by a pin 128 and a piston rod 130 pivotally connected to a bracket 132 on the cylinder 118 by a pin 134. The pivotal movement of the assemblies 32 is used to adjust the lateral position of the superstructure 14 with respect to the carrier, as more particularly described hereinafter.

Referring to FIG. 13, the hydraulic system for the self-powered trailer is shown mounted within the frame 100. This system includes an air-cooled engine 129 operatively connected to drive a pump 133, a hydraulic control panel 135 and a reservoir 138. Oil is drawn from the reservoir 138 through a hose 131, is fed to the control panel 135 through a hose 136 and is returned to the reservoir through a hose 140. The hydraulic circuit from the control panel 135 is clearly described in connection with FIG. 16.

Figure 15:
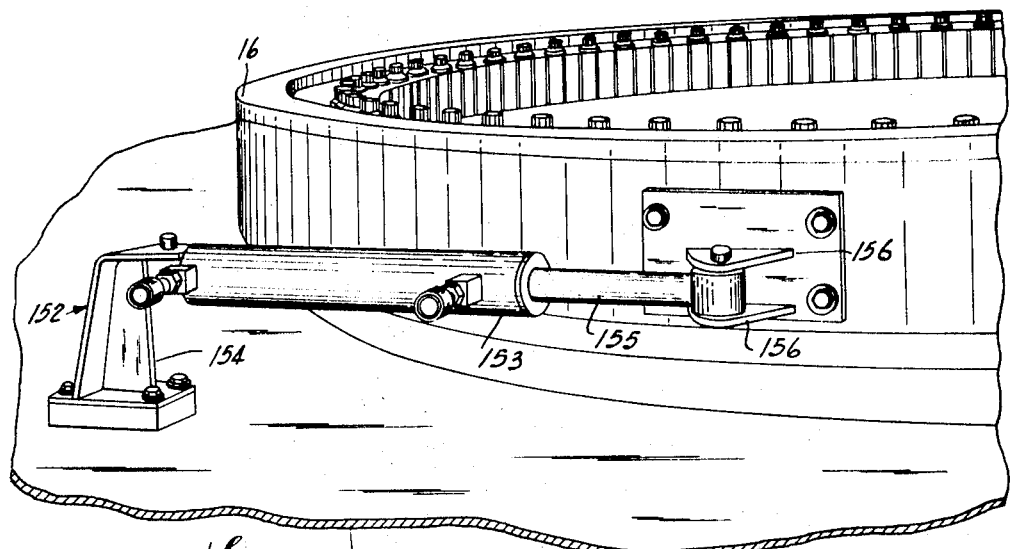
FIG. 15 is a fragmentary perspective view of the adjusting hydraulic piston and cylinder assembly for the upper half of the slew ring.

Means are provided for rotationally adjusting the position of the slewing ring 16 on the carrier to aid in aligning the slewing ring for connection to the superstructure. Such means, as seen in FIG. 15, is in the form of a hydraulic piston and cylinder assembly 152 having a cylinder 153 connected to a bracket 154 on the carrier 12 and a piston 155 connected to a bracket 156 mounted on the slewing ring 16. The hydraulic piston and cylinder assembly 152 is actuated to rotate the slewing ring 16 relative to the carrier to align the bolt holes in the slewing ring with the bolt holes on the superstructure just prior to decking the superstructure on the carrier. The piston and cylinder assembly 152 is removed from the carrier for normal operation of the truck crane.

THE HYDRAULIC CIRCUIT

The hydraulic circuit for the trailer 24 is used to operate all of the hydraulic piston and cylinder assemblies required to operate the decking and undecking assembly and is independent of either the superstructure or the carrier. As seen in FIG. 16, the air-cooled engine 129 is connected to drive the pump 133 to supply oil under pressure from the reservoir 138 to a manually actuated control switch 172 for selectively activating the hydraulic circuits in the control panel 135 or the hydraulic circuits for the steering assembly 142 and the slewing assembly 152.

In this regard, the control panel 135 includes a number of solenoid actuated valves 162, 164, 166, 168 and 170 for controlling the hydraulic assemblies 30, 32 and 124. The solenoid actuated valves 164 and 168 are connected by lines 163 and 169 to control the hydraulic piston and cylinder assemblies 30. The solenoid actuated valves 166 and 170 are connected by lines 167 and 171 to control the assemblies 32. The solenoid actuated valve 162 is connected by lines 165 to control the assemblies 124. The superstructure 14 is prevented from dropping at too fast a rate of speed by means of a restricted orifice 185 provided in the return lines from each of the piston assemblies 30, 32, and 124.

The steering assembly 142 and slewing assembly 152 are controlled by means of a solenoid actuated valve 174 connected to the manual switch 172 by line 175 and to manual switch valves 180 and 182 by lines 179. The manually controlled switch valves 180 and 182 are provided to operatively connect the solenoid valve 174 to control either the steering assembly 142 through lines 181 or slewing assembly 152 through lines 183.

Means are included in the hydraulic circuit for switching the rear wheel assembly 104 to a caster mode of operation. Such means is in the form of a manual switch valve 190 connected across lines 179 to the steering assembly 142. When the switch valve 190 is moved to the left, and the switches 180 and 182 are opened to the steering assembly 142, a closed circuit is established through lines 179 and 181 to both sides of the cylinder 144. Whenever the trailer 24 is pulled around a corner, the turning force acting on one of the wheels 107 will be transferred through the steering assembly to the other wheel until the forces acting on both wheels are equal as is well known in the art. The electric circuit for the solenoid switches 162, 164, 166, 168, 170 and 174 is a conventional type circuit requiring only an electric power source and a pair of pushbutton control switches for each solenoid valve. During idle operation, fluid is recycled to the reservoir 138 through lines 175 or 136 and 140. If system pressures exceeds limits, relief valve 190 returns excess oil to reservoir 138.

THE OPERATION

In performing the undecking operation, the superstructure 14 is turned at right angles to the carrier 12 (FIG. 1). The outriggers 18 are extended outward to provide stability for the carrier 12. The front strut 26 is secured to the fifth wheel adapter 52 by inserting the pins 74 in the opening 75 in the ears 76, and the hydraulic assemblies 30 are connected by lines 163 and 169 to the solenoid valves 164 and 168 on the trailer 24. The strut 26 can be pivoted about the fifth wheel 50 to align the plates 45 on the strut 26 with the plates 51 on the superstructure 14. The tractor 24 is backed up to the superstructure 14 and the assemblies 30 actuated to pivot the strut 26 about pins 62 and align the bottom hole 44 in the strut 26 with the corresponding hole 46 in the superstructure 14. The pin 48 is positioned in the holes 44 and 46 and the lock pin 74 is removed from the holes 75. The hydraulic assemblies 30 are actuated to pivot the strut about the pin 48 to align the upper hole 44 with the corresponding hole 46 in the superstructure 14 and the second pin 48 inserted into the upper holes 44 and 46.

The rear strut 28 is secured to the bar 116 on the strut mount 96 on the trailer by means of the locking plates 79 and pins 83. The hydraulic assemblies 32 are actuated to elevate the other end of the strut to align the bottom holes 86 on the strut with the corresponding holes 87 in the superstructure 14. The trailer is moved toward the superstructure 14 until the bottom hole 86 is aligned with the bottom hole 87 in the superstructure 14 and the pins 94 inserted in the holes. The pins 83 are then removed from the plates 79 and the hydraulic assemblies 32 are actuated to pivot strut 28 about the pins 94 until the upper holes 86 are aligned with the corresponding holes 87 in the superstructure 14. The second pins 94 are then positioned in the holes. The bolts in the slewing ring 16 are then removed to release the superstructure from the carrier. Solenoid actuated valves 164, 166, 168 and 170 are then actuated to elevate the superstructure 14 above the carrier 12 (Fig. 2). The outriggers 18 are retracted and the carrier driven out from under the superstructure. The superstructure is then dropped by reversing the solenoid valves 164, 166, 168 and 170 to seat the goosenecks 40 and 88 on the support rods 62 and 116, respectively. The lock pins 74 and 83 can be secured in place to lock the struts 26 and 28 to the tractor and trailer, respectively.

In performing a decking operation, the slewing cylinder assembly 152 is connected to the slewing ring 16 and the hydraulic assemblies 30 and 32 are pressurized to raise the superstructure 14 high enough to clear the carrier. The carrier 12 is backed under the superstructure 14 and the slewing ring 16 is aligned with the superstructure 14 by actuating the assembly 152. Lateral adjustment of the superstructure 14 with the slewing ring 16 is accomplished by actuating the cylinder assemblies 124 through solenoid valve 162 to pivot the assemblies 30 and 32. In order to align the bolt holes in the slewing ring 16 with the superstructure 14, the hydraulic cylinder assembly 152 is actuated to rotate the slewing ring 16. The superstructure 14 is then lowered onto the carrier by relieving the pressure on the cylinders 30 and 32 and allowing the carrier to come to rest on the slewing ring 16. The slewing ring 16 is connected to the superstructure 14 before the struts 26 and 28 are removed. The upper pins 48 are removed and the pressure in the assemblies 30 relieved to allow the goosenecks 40 to seat on the pin 62. The gooseneck is locked in place and the lower pins 48 are then removed. The same procedure is followed in removing the rear strut 28 from the superstructure. The upper pins 94 are removed and the pressure released to allow the gooseneck 88 to seat on the bar 116. The strut 28 is locked onto the bar 116 and the lower pins 94 are removed. Disassembly is completed by removing the hydraulic assembly 152 from the slewing ring 16.

We claim:

1. A decking and undecking assembly for removing the superstructure for a truck crane from the carrier, said assembly including,
    a tractor having a fifth wheel,
    a fifth wheel adapter mounted on said fifth wheel,
    a front strut adapted to be connected to the superstructure and to the fifth wheel adapter,
    a trailer,
    a rear strut adapted to be connected to the superstructure and to the trailer,
    and means for raising said front strut and said rear strut relative to said tractor and trailer, respectively, until the superstructure is clear of the carrier.

2. The assembly according to claim 1 including means for moving the superstructure laterally with respect to the carrier.

3. The assembly according to claim 1 wherein said raising means includes a first pair of hydraulic piston and cylinder assemblies pivotally mounted on said front strut and operatively positioned to engage said tractor, and a second pair of hydraulic piston and cylinder assemblies pivotally mounted on said trailer and operatively positioned to engage said rear strut.

4. The assembly according to claim 3 including means for pivoting said second pair of hydraulic piston and cylinder assemblies relative to said trailer.

5. The assembly according to claim 1 including a slewing ring on said carrier and a hydraulic piston and cylinder assembly for rotating said slewing ring relative to said carrier.

6. A decking and undecking assembly for disassembling a superstructure of a crane from the slewing ring on a carrier, said assembly comprising:
    a tractor,
    a front strut removably mounted on said tractor, said front strut being adapted for connection to said superstructure,
    hydraulic means for elevating said front strut with respect to said tractor,
    a trailer having a hydraulically controlled steering assembly,
    a rear strut removably mounted on said trailer and adapted to be connected to said superstructure,
    hydraulic means for elevating said rear strut with respect to said trailer,
    and means mounted on said trailer for controlling said front and rear strut hydraulic means.

7. The assembly according to claim 6, wherein said front strut elevating means comprises a first pair of hydraulic piston and cylinder assemblies pivotally connected to said front strut and operatively positioned to engage said tractor.

8. The assembly according to claim 6 wherein said rear strut elevating means comprises a second pair of hydraulic piston and cylinder assemblies pivotally mounted on said trailer and operatively positioned to engage said rear strut.

9. The assembly according to claim 8 including hydraulic means mounted on said trailer for pivoting said second pair of piston and cylinder assemblies to move the superstructure laterally relative to said carrier.

10. The assembly according to claim 6 including means for hydraulically rotating the slewing ring with respect to the superstructure.

11. A self powered decking and undecking apparatus for removing, transporting and replacing the superstructure for a truck crane on the slewing ring of the carrier, said apparatus comprising:
    a tractor, a front strut removably mounted on said tractor and adapted to be rigidly connected to the superstructure,
    a trailer,
    a rear strut removably mounted on said trailer and adapted to be rigidly connected to the superstructure, and means for hydraulically elevating said struts with respect to said tractor and trailer after said struts have been connected to the superstructure, whereby the carrier can be driven under the superstructure.

12. The apparatus according to claim 11 including means for locking said front strut to said tractor, and means for locking said rear strut to said trailer.

13. The apparatus according to claim 11 wherein said hydraulic elevating means includes a first pair of hydraulic piston and cylinder assemblies pivotally mounted on said front strut and operatively positioned to engage said tractor, a second pair of hydraulic piston and cylinder assemblies pivotally mounted on said trailer and operatively positioned to engage said rear strut, and a hydraulic control circuit for controlling said hydraulic piston and cylinder assemblies.

14. The apparatus according to claim 13 wherein said elevating means includes a third pair of hydraulic piston and cylinder assemblies operatively connected to pivot said second pair of hydraulic piston and cylinder assemblies.

15. The apparatus according to claim 13 wherein said trailer includes a rear steering assembly and a hydraulic piston and cylinder assembly connected to control said steering assembly.

16. The apparatus according to claim 15 wherein said control circuit includes a closed hydraulic circuit for said steering piston and cylinder assembly and a manually actuated switch for selectively connecting said steering piston and cylinder assembly into said closed circuit, whereby said rear steering assembly operates as a caster.

17. The apparatus according to claim 14 including a slewing ring piston and cylinder assembly for rotating the slewing ring, said hydraulic control circuit including means for controlling said slewing ring piston and cylinder assembly.

18. The method of removing and transporting the superstructure of a crane separately from the carrier, said method including the steps of rotating the superstructure to a position transverse to the carrier, securing front and rear struts to the superstructure, elevating the struts and superstructure above the carrier, removing the carrier from under the superstructure, and locking the front strut to the fifth wheel on a tractor and the rear strut to a trailer.

* * * * *